Oct. 29, 1957  O. NÜBLING  2,811,140
HYDRAULIC WHEEL MOTOR
Original Filed Dec. 8, 1950  2 Sheets-Sheet 2

INVENTOR.
Otto Nübling
BY
Michael S. Striker
agt.

United States Patent Office 2,811,140
Patented Oct. 29, 1957

2,811,140

HYDRAULIC WHEEL MOTOR

Otto Nübling, Berlin-Frohnau, Germany

Original application December 8, 1950, Serial No. 199,745, now Patent No. 2,694,288, dated November 16, 1954. Divided and this application November 15, 1954, Serial No. 468,911. In Germany September 7, 1949

Public Law 619, August 23, 1954
Patent expires September 7, 1969

3 Claims. (Cl. 121—70)

The present application is a divisional application of my copending application Serial No. 199,745, filed December 8, 1950, now Patent No. 2,694,288.

The present invention relates to hydraulic wheel motors, and more particularly to a gear-type hydraulic motor mounted in the hub of a wheel.

It is the main object of the present invention to provide a hydraulic drive motor mounted directly in a wheel of a vehicle.

It is another object of the present invention to drive the wheels of a vehicle by hydraulic motors of the type consisting of an inner rotary gear member and an outer rotary gear member, the axis of the inner and outer gear members being parallel and spaced from each other.

It is a further object of the present invention to provide in a hydraulic wheel motor, an auxiliary pump for removing oil leaking into the casing of the hydraulic motor.

With these objects in view, the present invention mainly consists of a wheel drive arrangement, comprising, in combination, supporting means adapted to be secured to a vehicle and having an outer annular surface having a first axis, the supporting means being formed with two conduits opening in two circumferentially spaced ports on the outer annular surface of the supporting means, a rotary annular inner member turnably mounted on the supporting means for rotation about the first axis and having an inner annular face engaging the annular surface, the rotary annular inner member having a plurality of outwardly projecting spaced projections defining recesses with each other, the rotary annular inner member being formed with a plurality of passages opening on the inner annular face passing therethrough and connecting the ports with the recesses; a rotary annular outer member mounted on the supporting means for rotation about a second axis parallel to the first axis and having inner projections defining recesses with each other and meshing with the outer projections of the rotary inner annular member, the number of the inner projections being greater than the number of the outer projections, the inner and outer projections of the rotary annular members defining chambers composed of the recesses and increasing in volume on one side of a plane passing through the first and second axes and decreasing in volume on the other side of the plane during rotation of the annular members so that an operating fluid supplied through one of the conduits and ports and through the passages into chambers located on one side of the plane expands these chambers and effects rotation of the rotary members and then passes into chambers decreasing in volume and through the other port and other conduit out of the supporting means; and a wheel means secured to one of the rotary members and rotating with the same.

Preferably, the rotary outer annular member is turnably supported on an axle which is fixed on the vehicle, and the annular inner member is turnably mounted on a supporting member which has a cylindrical surface eccentric with respect to the axis of the axle. The outer annular member is preferably secured to the hub of the wheel.

Since leakage cannot be entirely avoided, a small leakage pump is arranged in a casing which houses the rotary members, and returns operating fluid leaking into the casing to the pump from which the operating fluid is supplied. The leakage pump is preferably a small piston pump actuated by a cam ring rotating with one of the rotary members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
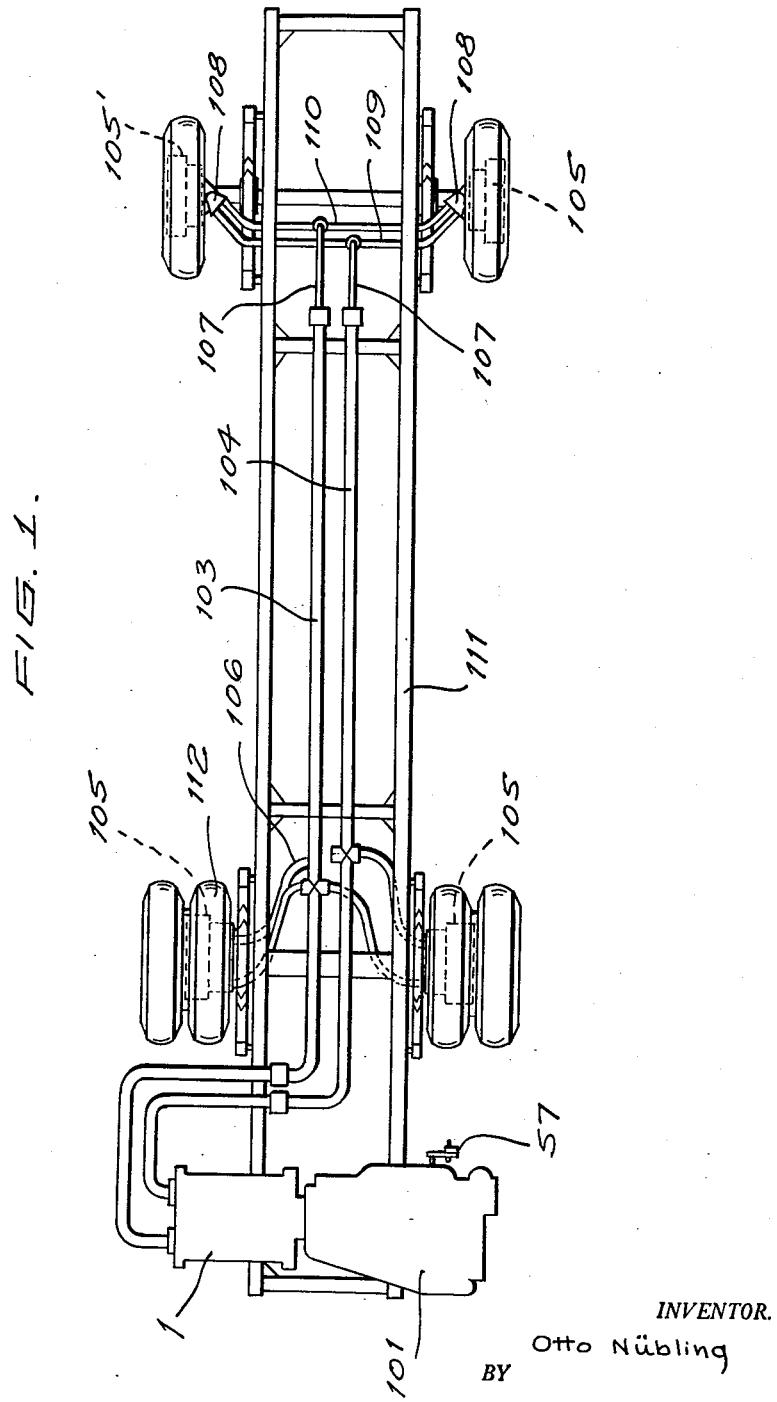
Fig. 1 is a schematic plan view illustrating an arrangement in which the wheel motors of the present invention are preferably used.

Referring now to the drawings, and more particularly to Fig. 1, the chassis of a vehicle 111 supports a prime mover 101, such as a gasoline or diesel engine, and a pump 1 driven by the prime mover 101. Hydraulic motors 105, and 105' respectively, are built into the rear and front wheels 112 of the vehicle. The inlet and outlet means of the hydraulic motors 105 are connected by hoses 106 to the pipes 103 and 104 which are connected to the pump 1. The forward ends of the pipes 103 and 104 are connected by hoses 107 to pipes 109 and 110 which are connected to the inlets and outlets of the motor 105' in the front wheels of the vehicle by turnable connections permitting turning of the front wheels for steering purposes. When the engine 101 is operated, the pump 1 presses an operating fluid, such as oil, through pipe 103 to the motors 105 and 105' for driving the same and thereby the wheel, while the oil returns from the motors through pipe 104 to the pump 1.

Figure 2:
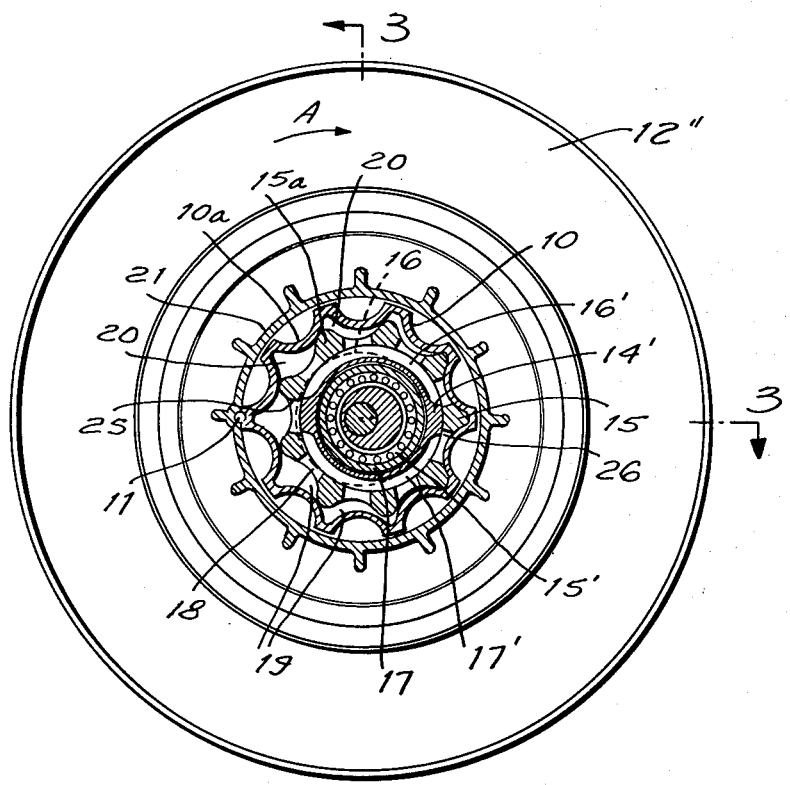
Fig. 2 is a sectional view taken on line 2—2 in Fig. 3 and illustrating a wheel motor according to the present invention.
Figure 3:
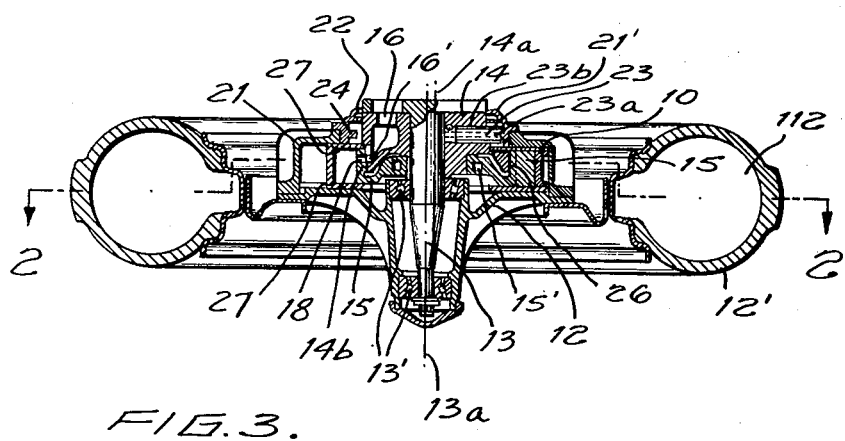
Fig. 3 is an axial sectional view taken on line 3—3 of Fig. 2.

The construction of the wheel motors according to the present invention is illustrated in Figs. 2 and 3.

A wheel means 112 has a tire 12', and a hub member 12. The hub member 12 is fixedly connected to a casing 21 which includes an annular cover 21' provided with a packing ring 22. A supporting member 14 is fixedly secured to the axle 13 which is secured in a suitable manner to the vehicle. The supporting member 14 has an outer annular or cylindrical surface 14b which is eccentric with respect to the axis of the axle 13 so that the axis 14a of the outer cylindrical surface 14b of the supporting member 14 is parallel to the axis 13a of the axle 13. The outer surface of the supporting member 14 has a cylindrical portion coaxial with axis 13a and engaged by the packing ring 22 so that a sealed space is formed between the supporting member 14 and the casing 21, 21'.

A rotary inner annular member 15 is turnably mounted on the supporting member 14 by means of a ball bearing 15' for rotation about the axis 14a of the supporting member 14. The inner annular member 15 has a cylindrical inner face slidably engaging the cylindrical outer surface 14b of the member 14 which is formed with two ports 16' and 17' which are separated by wall portions 14' of the supporting member 14. The free ends of the wall portions 14' have cylindrical faces 25, 26 which are portions of surface 14b and engage the inner cylindrical face of the inner annular member 15. The operating liquid is supplied through inlet conduit 17 and outlet conduit 16 which extend in axial direction in the supporting member 14 and open in the ports 16' and 17' into radial passages 18 opening on the inner face of inner rotary member 15.

The inner annular member 15 has outwardly projections or teeth 15a which are separated by recesses which communicate through the passages 18 with the ports 16' and 17'.

An outer annular member 10 is fixedly secured by bolt means 11 to the casing 21, and has an axis coinciding with the axis of the casing 21 and with the axis 13a of the axle 13 on which the casing 21 and the hub 12 are supported by means of ball bearings 13'.

The outer annular member 10 has inner projections or teeth 10a meshing with the outer projections of the inner annular member. The number of inner projections 10a exceeds the number of outer projections 15a by one. The recesses between the inner teeth 10a and the recesses between the outer teeth 15a together define chambers which expand and contract during rotation of the outer and inner annular members 10 and 15. As best seen in Fig. 2, the working chambers 19 located on one side of a plane passing through the axes 13a and 14a will expand during rotation in the direction of the arrow A, while the working chambers 20 located on the other side of the plane, that is in the upper half of Fig. 2, will contract during rotation.

The wheel motor according to the present invention operates in the following manner:

When operating fluid such as oil is supplied through the inlet conduit 17, it passes through port 17' and passages 18 into the working chambers 19 and urges the same to expand so that the annular members 10 and 15 are driven to rotate in the direction of the arrow A. When the working chambers 19 reach maximum volume, they pass through the plane defined by the axes 13a and 14a, and start to decrease in volume as chambers 20 so that an operating fluid is forced through the passages 18 into the outlet port 16' from where it is discharged through the outlet conduit 16. As previously described with reference to Fig. 1, the outlet conduit 16 is connected by a pipe 104 to the suction inlet of pump 1, while the inlet conduit 17 is connected by pipe 103 to the pressure outlet of the pump.

The packing ring 22 may not be sufficient to prevent leakage of operating fluid from the hydraulic motor, and therefore a small leakage pump 23 is provided. A spring-loaded pump piston 23a is arranged in a vertical downwardly extending bore 23b in the supporting member 14 at the lowest point of the casing 21 so that the axis of the pump 23 extends downwardly in vertical direction. An annular cam means 24 is provided in the casing 21 and preferably attached to the casing member 21', which rotates with the outer annular member 10. During rotation of the wheel 112, the annular cam 24 engages the spring-loaded pump piston and reciprocates the same. The pump piston is provided with slots through which oil leaked into the lowermost space in the casing 21 is sucked up and forced through a return valve and an outlet, not shown in the drawing, into the outlet conduit.

It will be understood that each of the elements described above, or two or more together, may also find a useful application in other types of hydraulic wheel motors differing from the types described above.

While the invention has been illustrated and described as embodied in a hydraulic wheel motor arrangement including two rotary annular meshing gear members having parallel axes and defining together expanding and contracting working chambers for an operating fluid, and a wheel hub connected to one of the rotary gear members, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A wheel drive arrangement comprising, in combination, supporting means adapted to be secured to a vehicle and having an outer annular surface having a first axis, said supporting means being formed with two conduits opening in two circumferentially spaced ports on said first outer annular surface of said supporting means; a rotary annular inner member turnably mounted on said supporting means for rotation about said first axis and having an inner annular face engaging said annular surface, said rotary annular inner member having a plurality of outwardly projecting spaced projections defining recesses with each other, said rotary annular inner member being formed with a plurality of passages opening on said inner annular face passing therethrough and connecting said ports with said recesses; a rotary annular outer member mounted on said supporting means for rotation about a second axis parallel to said first axis and having inner projections defining recesses with each other and meshing with said outer projections of said rotary inner annular member, the number of said inner projections being greater than the number of said outer projections, said inner and outer projections of said rotary annular members defining chambers composed of said recesses and increasing in volume on one side of a plane passing through said first and second axes and decreasing in volume on the other side of said plane during rotation of said annular members so that an operating fluid supplied through one of said conduits and ports and through said passages into chambers located on one side of said plane expands these chambers and effects rotation of said rotary members and then passes into chambers decreasing in volume and through the other port and other conduit out of said supporting means; a tubular member secured to one of said rotary members and rotating with the same; a casing member secured to said tubular member for rotation therewith and enveloping said rotary annular members, said casing member being in sealing engagement with said supporting means; a leakage pump means on said supporting means within said casing member and having inlet means located at the lowermost point of said casing member and outlet means communicating with one of said conduits; and actuating cam means connected to one of said rotary members for rotation therewith and engaging and actuating said leakage pump means during rotation.

2. A wheel drive arrangement comprising, in combination, a supporting member having an outer annular surface having a first axis, said supporting member being formed with two conduits opening in two circumferentially spaced ports on said first outer annular surface of said supporting member, said supporting member being formed with a vertical bore extending downwardly therein; an axle adapted to be fixedly secured to a vehicle and being fixedly secured to said supporting member, said axle having a second axis parallel to said first axis; a rotary annular inner member turnably mounted on said supporting member for rotation about said first axis and having an inner annular face engaging said annular surface, said rotary annular inner member having a plurality of outwardly projecting spaced projections defining recesses with each other, said rotary annular inner member being formed with a plurality of passages opening on said inner annular face passing therethrough and connecting said ports with said recesses; a rotary annular outer member mounted on said axle for rotation about said second axis and having inner projections defining recesses with each other and meshing with said outer projections of said rotary inner annular member, the number of said inner projections being greater than the number of said outer projections, said inner and outer projections of said rotary annular members defining chambers composed of said recesses and increasing in volume on one side of a plane passing through said first and second axes and decreasing in volume on the other side of said plane during rotation of said annular members so that an operating fluid supplied through one of said conduits and ports and through said passages into chambers located on one side of said plane expands these chambers and effects rotation of said rotary members and then passes into chambers decreasing in volume and through the other port and other conduit out of said supporting member; a hub member secured to said outer annular member and rotating with the same; a casing member secured to said hub member for rotation therewith and enveloping said rotary annular members, said casing member being in sealing engagement with said supporting member; a leakage pump means located within said casing member and including a piston member reciprocable in said bore in said supporting member and having inlet means located at the lowermost point of said casing member and outlet means communicating with one of said conduits; and actuating cam means connected to said casing member for rotation therewith and engaging and actuating said piston during rotation.

3. A wheel drive arrangement comprising, in combination, a supporting member having an outer cylindrical surface having a first axis, said supporting member being formed with two conduits opening in two diametrically arranged ports on said first outer annular surface of said supporting member; an axle adapted to be fixedly secured to a vehicle and being fixedly secured to said supporting member, said axle having a second axis parallel to said first axis; a rotary annular inner member turnably mounted on said supporting member for rotation about said first axis and having an inner cylindrical face engaging said cylindrical surface, said rotary annular inner member having a plurality of outwardly projecting spaced projections defining recesses with each other, said rotary annular inner member being formed with a plurality of passages opening on said inner cylindrical face passing therethrough and connecting said ports with said recesses; a rotary annular outer member mounted on said axle for rotation about said second axis and having inner projections defining recesses with each other and meshing with said outer projections of said rotary inner annular member, the number of said inner projections being one greater than the number of said outer projections, said inner and outer projections of said rotary annular members defining chambers composed of said recesses and increasing in volume on one side of a plane passing through said first and second axes and decreasing in volume on the other side of said plane during rotation of said annular members so that an operating fluid supplied through one of said conduits and ports and through said passages into chambers located on one side of said plane expands these chambers and effects rotation of said rotary members and then passes into chambers decreasing in volume and through the other port and other conduit out of said supporting member; a wheel hub member secured to said outer annular member and rotating with the same; a casing member secured to said wheel hub member for rotation therewith and enveloping said rotary annular members, said casing member being in sealing engagement with said supporting member; a leakage pump means located within said casing member and including a piston member reciprocable in said bore in said supporting member and having inlet means located at the lowermost point of said casing member and outlet means communicating with one of said conduits; and actuating cam means connected to said casing member for rotation therewith and engaging and actuating said piston during rotation.

References Cited in the file of this patent

UNITED STATES PATENTS 694,333    Szabo                  Feb. 25, 1902

FOREIGN PATENTS 85,258    Germany              Feb. 11, 1896